Dec. 12, 1944. J. W. JONES 2,364,720
RANGE ESTIMATING TRAINER
Filed Sept. 28, 1943  5 Sheets-Sheet 1
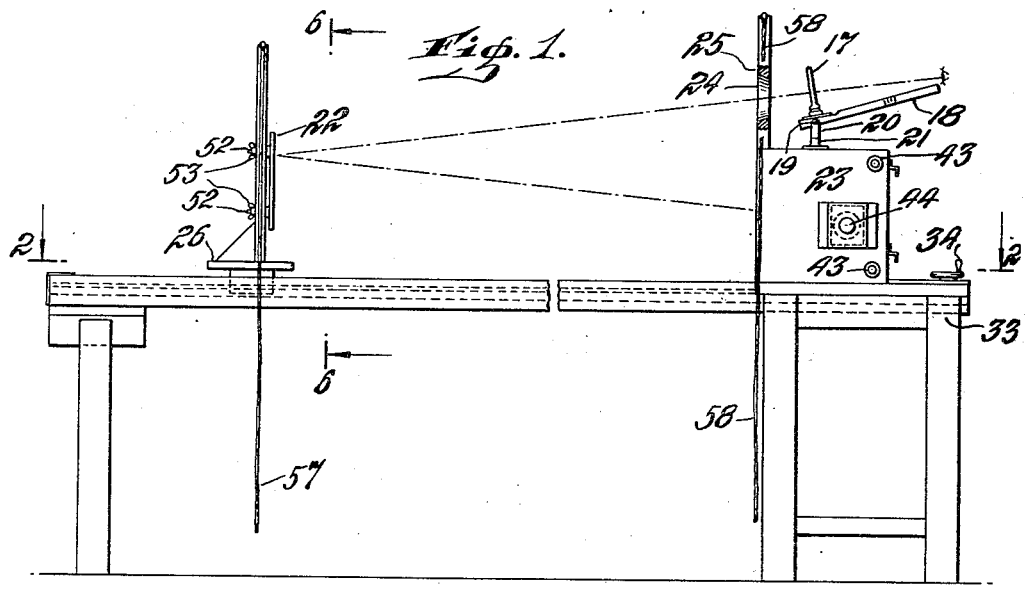
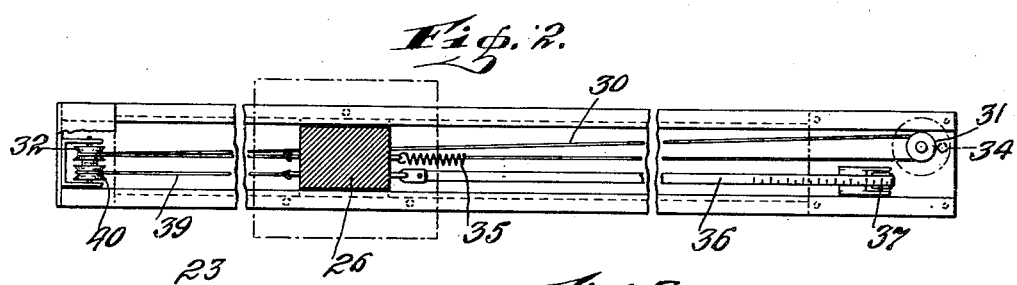
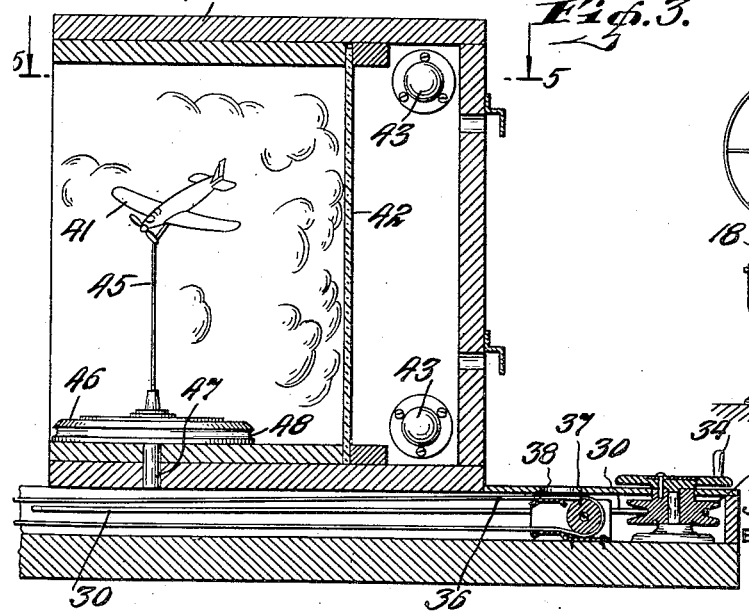
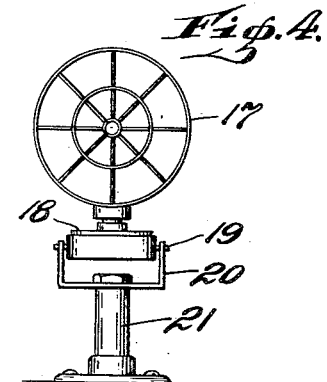
INVENTOR
JOSEPH W. JONES
BY
ATTORNEY Dec. 12, 1944.  J. W. JONES  2,364,720
RANGE ESTIMATING TRAINER
Filed Sept. 28, 1943   5 Sheets-Sheet 2

INVENTOR
JOSEPH W. JONES
BY
ATTORNEY

Dec. 12, 1944.　　　　　J. W. JONES　　　　　2,364,720
RANGE ESTIMATING TRAINER
Filed Sept. 28, 1943　　　5 Sheets-Sheet 3
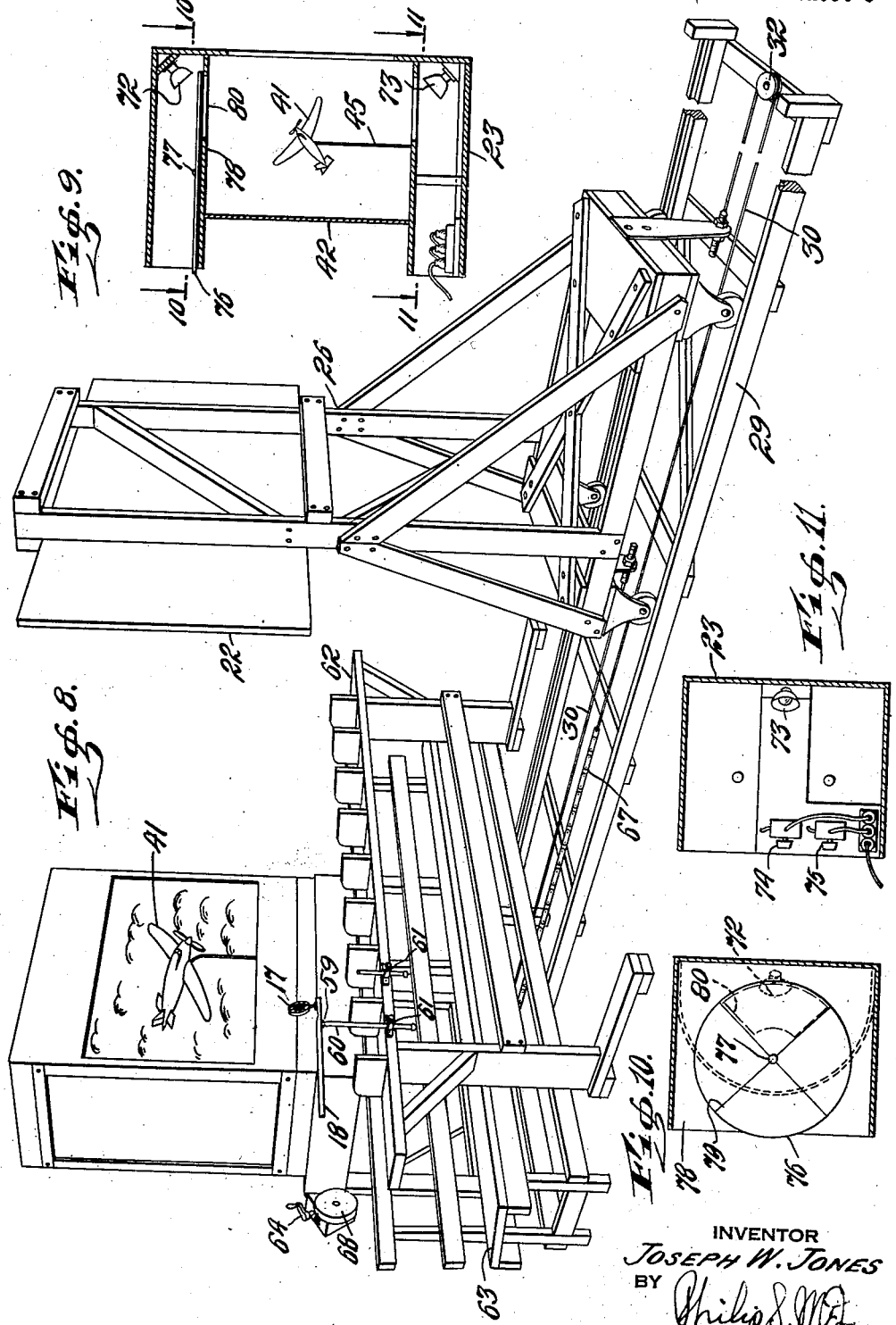
INVENTOR
JOSEPH W. JONES
BY
ATTORNEY Dec. 12, 1944.   J. W. JONES   2,364,720
RANGE ESTIMATING TRAINER
Filed Sept. 28, 1943   5 Sheets-Sheet 4
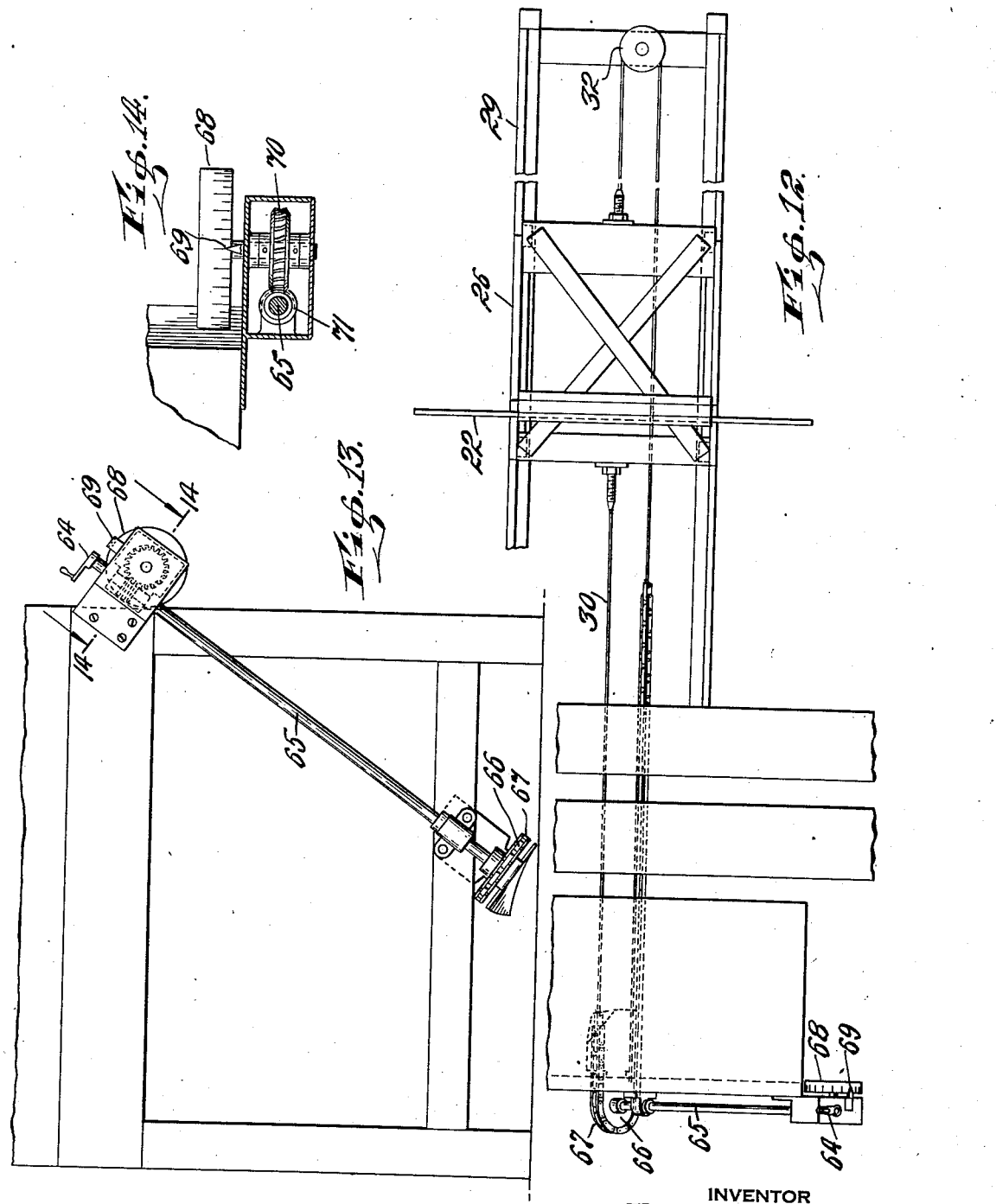
INVENTOR
JOSEPH W. JONES
BY
ATTORNEY

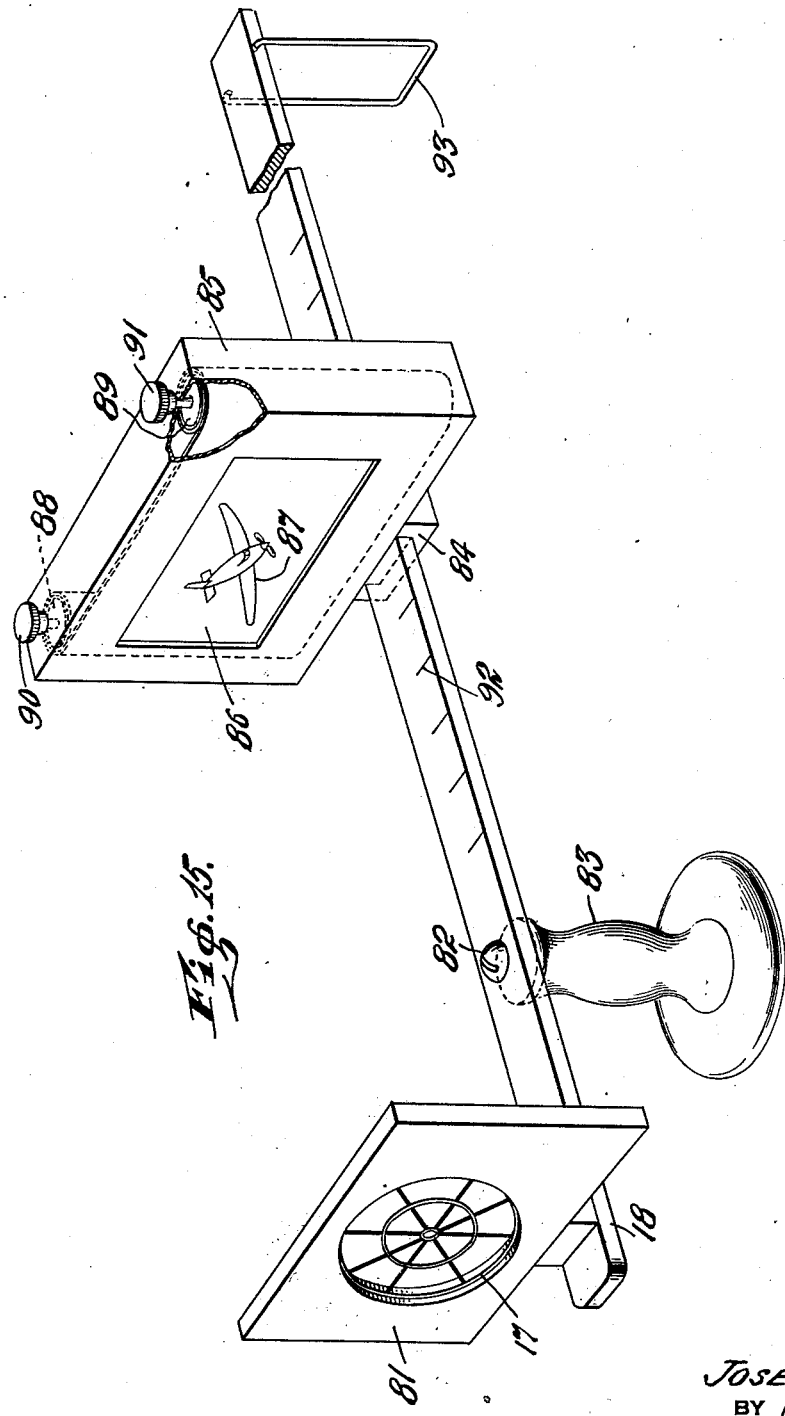

Patented Dec. 12, 1944

2,364,720

UNITED STATES PATENT OFFICE 2,364,720

RANGE ESTIMATING TRAINER

Joseph W. Jones, New York, N. Y.

Application September 28, 1943, Serial No. 504,197

9 Claims. (Cl. 35—25)

The invention here disclosed relates to apparatus for training in the recognition of aircraft, estimation of distance, speed, angle of approach and other related factors.

Objects of the invention are to simulate as nearly as possibe actual flight conditions as they appear through the sight of a gun or plane and to accomplish this with apparatus of a practical character and size adapted to be set up and used in an ordinary classroom.

Special objects of the invention are to provide sighting mechanism which will enable a student to quickly grasp the fundamentals of aircraft gunnery and strategy and which will provide for the instant checking, as to accuracy of range estimates and the like.

Other objects are to enable quick change of lighting effects to accurately simulate appearances created by or resulting from different atmospheric conditions at different times of day.

Further objects of the invention will appear in the course of the following specification, in which the novel features of the invention are particularly set forth and broadly claimed.

The drawings accompanying and forming part of the specification illustrate a number of different embodiments of the invention and structure which may be further modified and changed all within the true intent and broad scope of the invention as hereinafter defined and claimed.

Fig. 1 of the drawings is a side elevation of one of the trainers with the cowl board appearing in vertical section.

Fig. 2 is a broken horizontal sectional view as on line 2—2 of Fig. 1, showing particularly the track and mechanism for shifting the mirror back and forth.

Fig. 3 is a vertical sectional view on a larger scale of the diorama box and adjusting and distance indicating mechanism at that end of the machine, this view being taken as on substantially the plane of line 3—3 of Fig. 5.

Fig. 4 is a detail view of the universally mounted gun sight.

Fig. 8 is a perspective view of a larger class instruction embodiment of the invention.

Fig. 9 is a vertical sectional view of the diorama box illustrated in this form of the invention.

Figure 5:
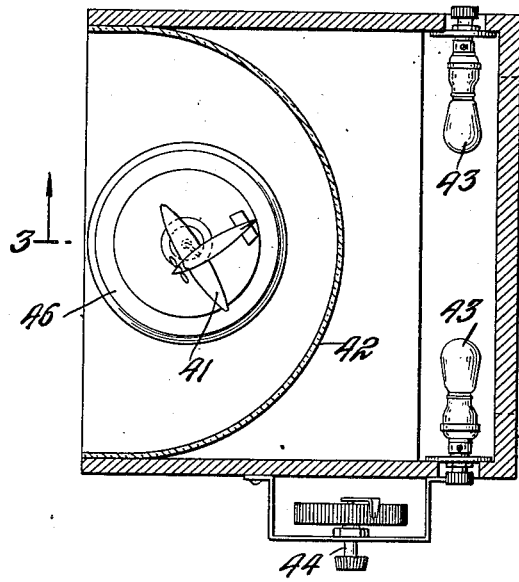
Fig. 5 is a horizontal sectional view of the diorama box, on substantially the plane of line 5—5 of Fig. 3.

Figs. 10 and 11 are horizontal sectional views of the diorama box on substantially the planes of lines 10—10 and 11—11 of Fig. 9.

Fig. 12 is a broken plan view of the apparatus appearing in Fig. 8.

Fig. 13 is a broken rear elevation of the mirror adjusting mechanism employed in this form of the apparatus.

Fig. 14 is an enlarged sectional detail of the distance indicating mechanism as on substantially the plane of line 14—14 of Fig. 13.

Fig. 15 is a broken part sectional perspective view of a simplified form of the mechanism.

In the several forms of the invention illustrated, the observer views the image, representation or picture of the aircraft through a ring sight 17, and thus sees the craft just as he would in actual service.

In Fig. 1, the gun sight is shown carried by a stick 18, in the nature of a pointer, pivoted horizontally at 19, in a yoke 20, pivoted to swing on a vertical axis at 21.

By manipulating the stick 18, the sight can be aimed on the target appearing on the mirror 22, as an image reflected from the diorama box 23. A special feature, in this first form of the invention, is the mounting of the sight directly on the top of the diorama box, at a height convenient to the operator, directly back of a sighting opening 24, in the cowl board or panel 25.

Figure 6:
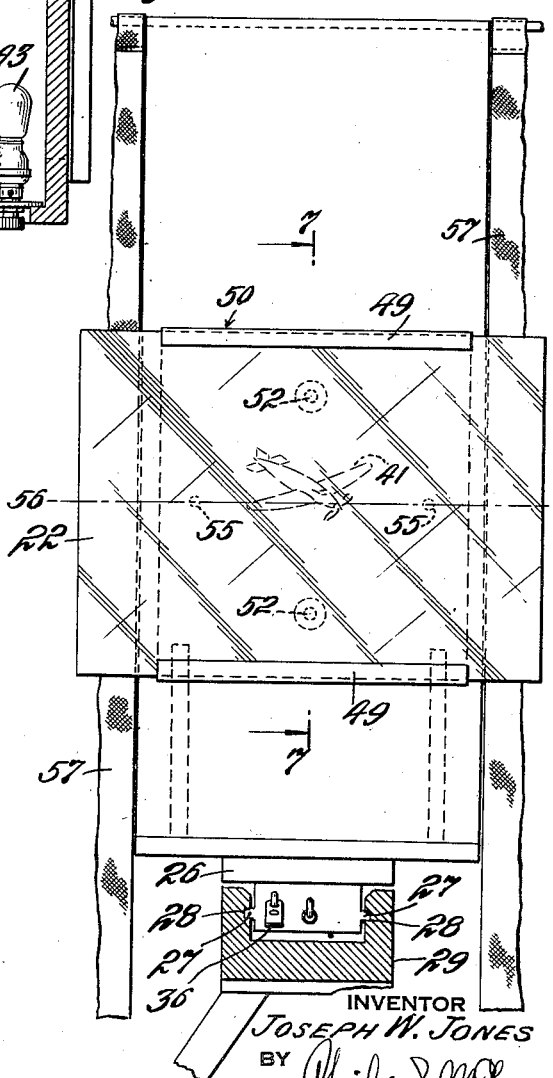
Fig. 6 is a broken cross-sectional view as on substantially the plane of line 6—6 of Fig. 1.

The mirror 22, is mounted on a carriage 26, shown in Fig. 6 in the form of a block, having ribs 27, sliding in grooves 28, in the opposite sides of a channeled trackway 29.

Travel is imparted to the sliding carriage by a cable 30, extending from the base of the carriage in opposite directions over pulleys 31, 32, located at or adjacent the opposite ends of the trackway. In the illustration, the pulley 31, which is the driving pulley, is mounted in the top of the table 33, which supports the diorama and is provided with a hand crank or operating wheel 34, exposed at the top of the table. A spring 35, is shown in Fig. 2, interposed in the driving cable connection with the carriage to keep the cable taut.

A distance indicating tape 36, is shown connected with the sliding carriage and as passing over a spool 37, sunk in the top of the table in position to expose the markings on the tape through a window opening 38, the lower run of this tape being extended by a cable or cord 39, over a guide pulley 40, back to the carriage to constitute a continuous loop.

The diorama is shown in Figs. 3 and 5 as comprising a model airplane 41, supported in front of a curvilinear transparent background 42, painted to create sky and cloud effects and illuminated from lamps 43, located in the corners of the box, which may be independently controlled and if desired, be of different colors. In this particular illustration, these lamps are all controlled from a variable rheostat at 44.

The model airplane is shown mounted on a more or less invisible wire stand 45, carried by a base 46, rotatably set in the bottom of the box at 47. This rotatable base is shown as having a cord groove 48, to permit the use of a control cord for rotating the model into different angular positions. This base also may be simply turned by a hand reached into the open front side of the box.

Figure 7:
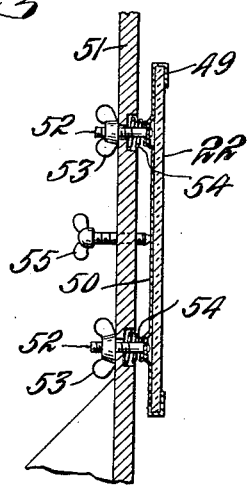
Fig. 7 is a broken-sectional detail as on line 7—7 of Fig. 6.

The mirror 22, is shown in Figs. 6 and 7, as slidably entered behind the top and bottom edge flanges 49, of a holder 50, held to the upright panel 51, of the sliding carriage by vertically aligned bolts 52, and wing nuts 53, and tensioned away from the panel by springs 54, surrounding such bolts. Horizontally aligned wing bolts 55, extending through the back of the panel into engagement with the back of the holder, form fulcrum points on which the holder can pivot on a horizontal axis 56, Fig. 6, and serve, when independently adjusted, as means for shifting the holder about the vertical axis represented by line 7, 7. The mirror may thus be set at different angles of inclination to locate the image at the best position for observation through the gun sight.

To enable the student to better concentrate on the image appearing on the mirror, the carriage may be curtained at the top and down the sides, about the mirror as indicated at 57, and similarly curtains 58, may be provided about the cowl board and diorama box.

The larger form of the apparatus shown in Figs. 8 to 14, is generally similar to the form first described and where possible, the same reference characters have been employed.

Class instruction is possible in this form of the apparatus by providing a number of gun sights mounted for universal adjustment at 59, on the upper ends of posts 60, adjustably clamped at 61, on a table 62, extending across the trackway in front of the diorama. Thus students sitting on a bench 63, back of said table, may adjust their sights to the most convenient level for observing the image appearing on the mirror 22.

Shifting of the carriage back and forth is accomplished in this particular illustration, by a hand crank 64, at one side of the diorama box on the upper end of a shaft 65, Figs. 12, 13, carrying at the lower end a sprocket 66, for the chain 67, connected in as a part of the carriage drive cable 30.

Distance indication is provided in this illustration, by an indicator wheel 68, in cooperation with an index 69, and having a worm gear 70, in mesh with a worm 71, on the shaft 65 Fig. 14.

The diorama is here shown as illuminated from the front, instead of from the rear, from reflector lamps 72, 73, located in the upper and lower front portions of the box. The curved sky background 42, thus in this case need not be transparent. The upper and lower lamps may be independently controlled as from separate rheostats 74, 75, Fig. 11.

Different color effects are created by the flat disc 76, pivoted at 77, on the horizontal partition 78, forming the top of the diorama chamber, said disc having segments 79, of different colors, which pass beneath the lamp 72, and above the opening 80, in such partition when the disc is turned.

The edge of the disc is shown in Figs. 9 and 10, as exposed at the back of the diorama box, so that it may be turned by hand to locate any color division or portions of different divisions within the range of the downwardly directed lamp 72.

By using proper segments and controlling the upper and lower lamps as to intensity, various fog and cloud effects may be produced, as well as the different colorings from above or below, that are predominant at different times of day, particularly such as in the morning and evening. Thus the students or student, can be trained to meet particularly difficult conditions which may be anticipated as likely to be encountered in actual service.

In the simplified form of apparatus shown in Fig. 15, the ring sight 17, is directly located in a small cowl board or panel 81, on the end of the pointer stick 18. This stick is shown as loosely pivoted at 82, on the upper end of a supporting post 83, and as having slidably engaged thereon at 84, a diorama box 85, containing a record strip 86, carrying pictures 87, of different airplanes. This record strip is supported on spools 88, 89, which can be turned by the finger knobs 90, 91.

The bar or stick 18, is shown as having a scale 92, for checking the distance estimated by the observer. The bar is shown as having a looped wire support 93, hinged to the far end of the same for supporting the bar in substantially horizontal relation on a table top, when the instrument is to be used in that way.

All forms of the invention are of a character enabling use of the same in an ordinary class room. The various controls of adjustments described, enable different scenic and target aircraft effects to be produced comparable with those existing under actual combat conditions.

By observing the action through the ring sight, the student gets the various effects just as he would see them in service and hence becomes accustomed to calibrating the size and distance of the target through the rings and segments of the sight.

What is claimed is:

1. An aircraft gunnery trainer, comprising a movably mounted ring sight having a handle for aiming the same, an aircraft depicting diorama and a reflecting mirror in front of said diorama interposed in the line of observation through said ring sight, said mirror and diorama being relatively adjustable toward and away from each other to vary the range.

2. An aircraft gunnery trainer, comprising a movably mounted ring sight having a handle for aiming the same, an aircraft depicting diorama, a reflecting mirror in front of said diorama interposed in the line of observation through said ring sight, said mirror and diorama being relatively adjustable toward and away from each other to vary the range and means for positively effecting relative adjustment of said mirror and diorama toward and away from each other.

3. An aircraft gunnery trainer, comprising a movably mounted ring sight having a handle for aiming the same, an aircraft depicting diorama, a reflecting mirror in front of said diorama interposed in the line of observation through said ring sight, said mirror and diorama being relatively adjustable toward and away from each other to vary the range, tape means for positively effecting relative adjustment of said mirror and diorama toward and away from each other and means cooperative with said adjusting tape means for indicating the effective range.

4. An aircraft gunnery trainer, comprising a movably mounted ring sight having a handle for aiming the same, an aircraft depicting diorama, a reflecting mirror in front of said diorama interposed in the line of observation through said ring sight, said mirror and diorama being relatively adjustable toward and away from each other to vary the range and an adjustable color wheel in said diorama for creating different shade and color effects.

5. A trainer of the character disclosed, comprising a diorama box for creating scenic and target aircraft effects, a ring sight swivelly mounted on top of said diorama box, a reflecting mirror in front of said diorama box and means for effecting adjustment of said mirror toward and away from said diorama box and ring sight.

6. A trainer of the character disclosed, comprising a diorama box for creating scenic and target aircraft effects, a ring sight swivelly mounted on top of said diorama box, a reflecting mirror in front of said diorama box, means for effecting adjustment of said mirror toward and away from said diorama box and ring sight, controllable illuminating means for said effects in said box and an adjustable color wheel associated with said illuminating means.

7. A gunnery trainer, comprising a ring sight, means mounting the same for universal hand adjustment, an aircraft depicting diorama observable through said ring sight, a reflecting mirror interposed between said ring sight and diorama and means for effecting adjustment of said mirror toward and away from said diorama.

8. A gunnery trainer, comprising a ring sight, means mounting the same for universal hand adjustment, an aircraft depicting diorama observable through said ring sight, a reflecting mirror interposed between said ring sight and diorama, means for effecting adjustment of said mirror toward and away from said diorama and means synchronized with said adjusting means for indicating distance between said mirror and diorama.

9. A gunnery trainer, comprising a ring sight, means mounting the same for universal hand adjustment, an aircraft depicting diorama observable through said ring sight and a reflecting mirror interposed between said ring sight and diorama.

JOSEPH W. JONES.